United States Patent [19]

Boxall

[11] 4,038,498
[45] July 26, 1977

[54] CENTRAL OFFICE SWITCHING SYSTEM WITH REMOTE LINE SWITCH

[76] Inventor: Frank S. Boxall, 380 Eleanor Drive, Woodside, Calif. 94062

[21] Appl. No.: 676,542

[22] Filed: Apr. 12, 1976

[51] Int. Cl.² .............................................. H04Q 3/60
[52] U.S. Cl. ................................................ 179/18 FC
[58] Field of Search ........................... 179/18 FC, 2 A

[56] References Cited
U.S. PATENT DOCUMENTS

| | | | |
|---|---|---|---|
| 3,022,382 | 2/1962 | Ewin | 179/18 FC |
| 3,123,674 | 3/1964 | Brooks et al. | 179/18 FC |
| 3,217,109 | 11/1965 | Abert | 179/18 FC |
| 3,389,229 | 6/1968 | Torisu | 179/18 FC |

*Primary Examiner*—Thomas A. Robinson

[57] ABSTRACT

A telephone subscriber system in which a concentrating portion of the central office telephone switching network is remotely located and connects to the remainder of the switching network at the central office via concentrated voice transmission paths and via multichannel data links which forward control and status signals between the two portions of the switching network.

8 Claims, 12 Drawing Figures

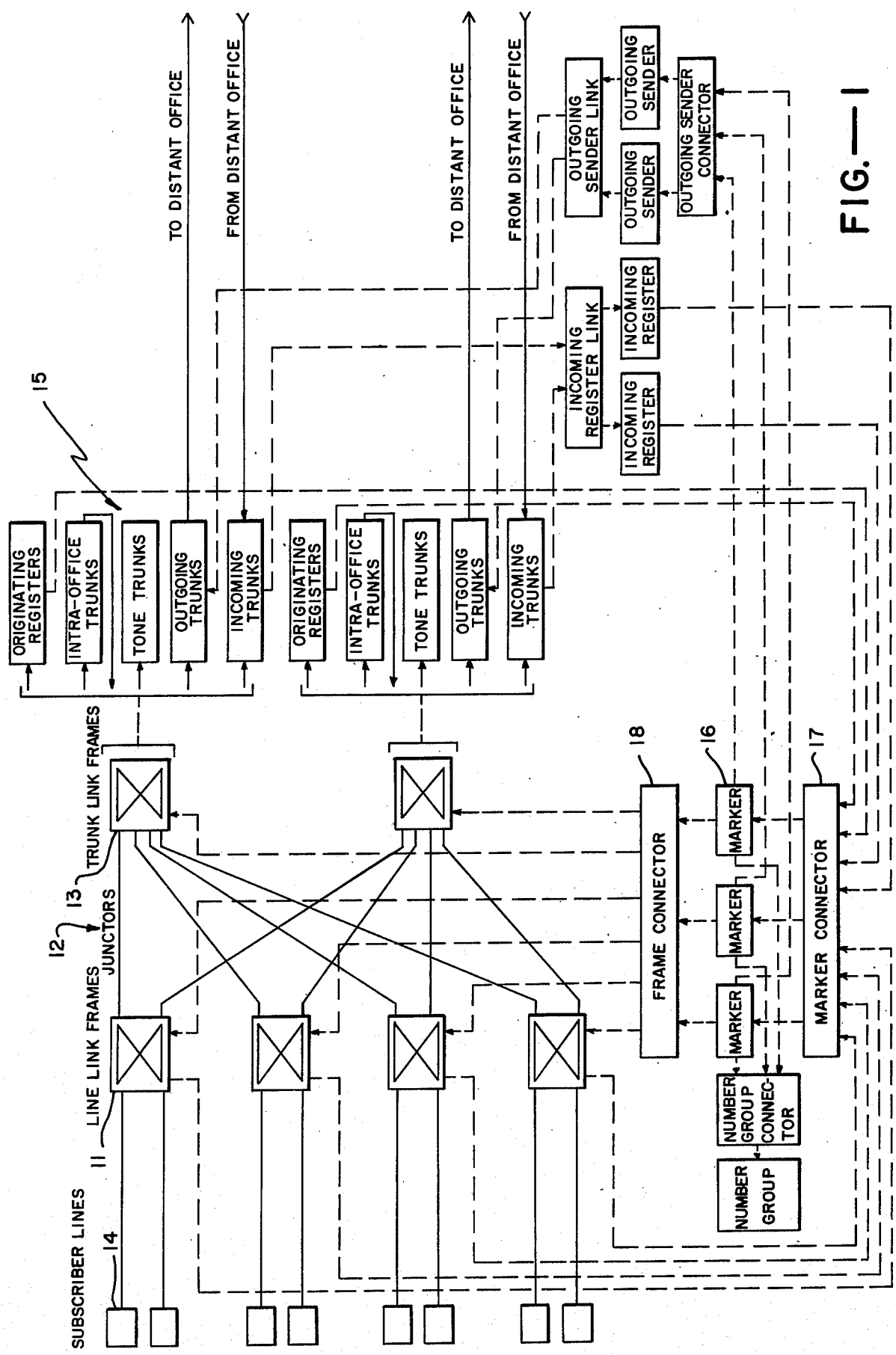

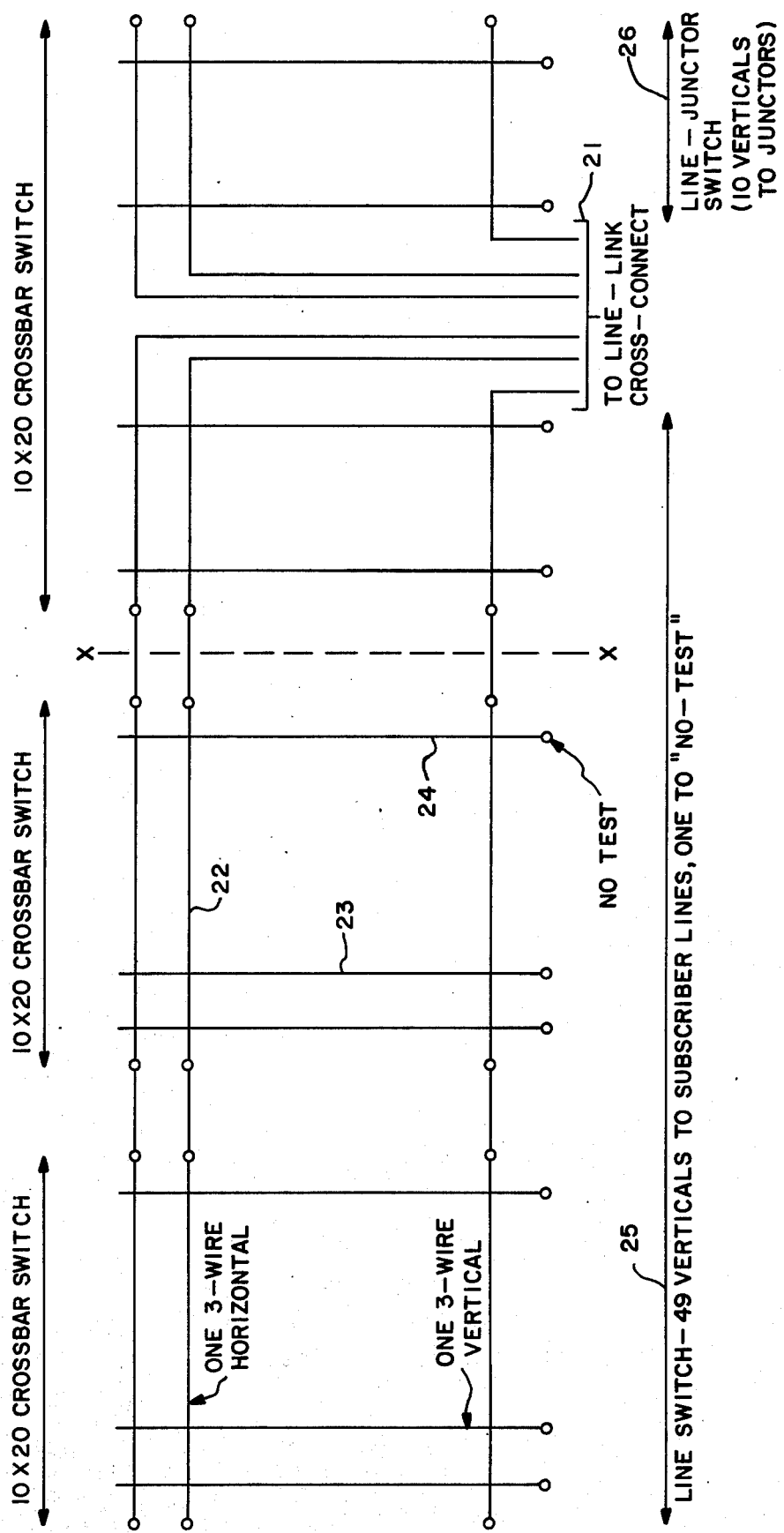
FIG.—2

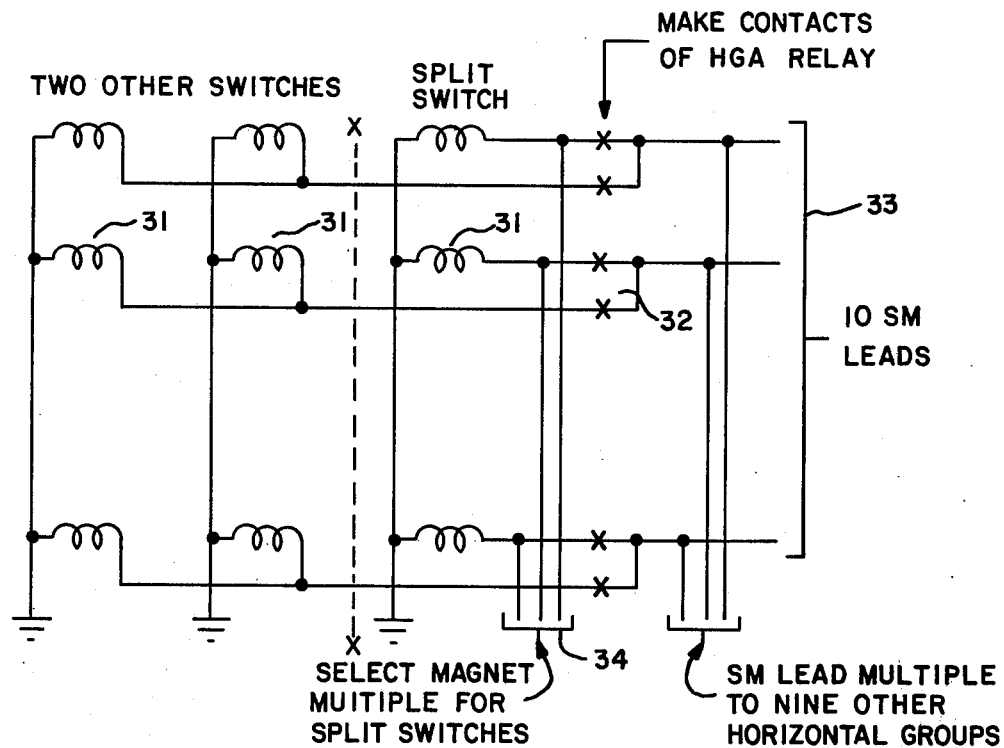
FIG.—3
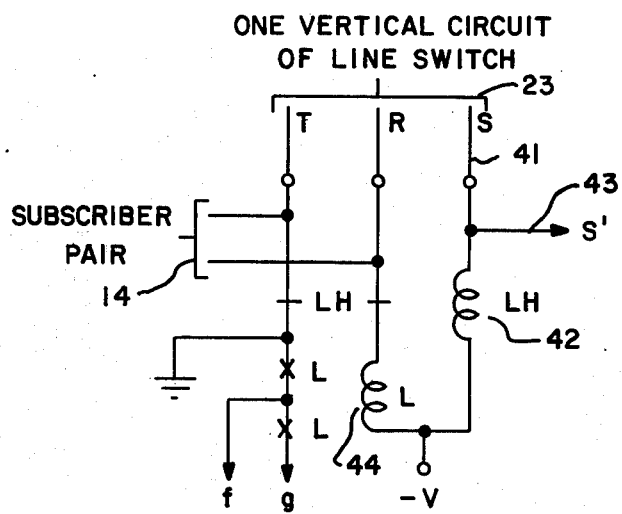
FIG.—4

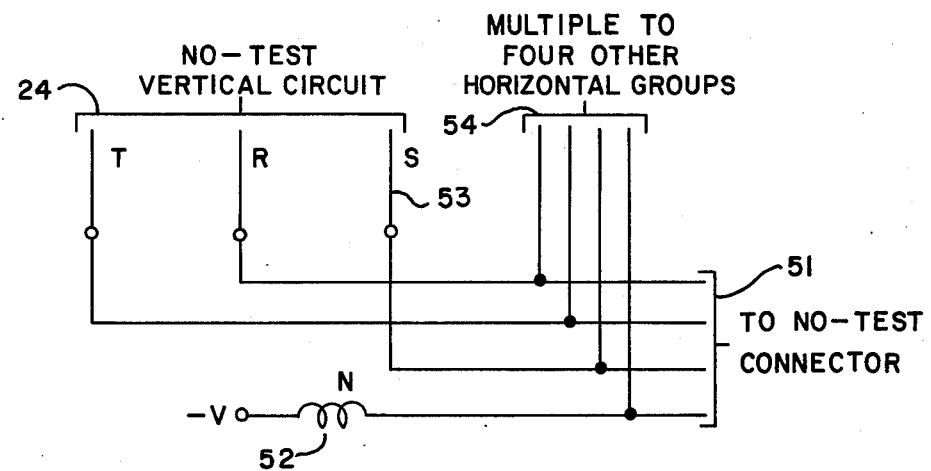
FIG.—5
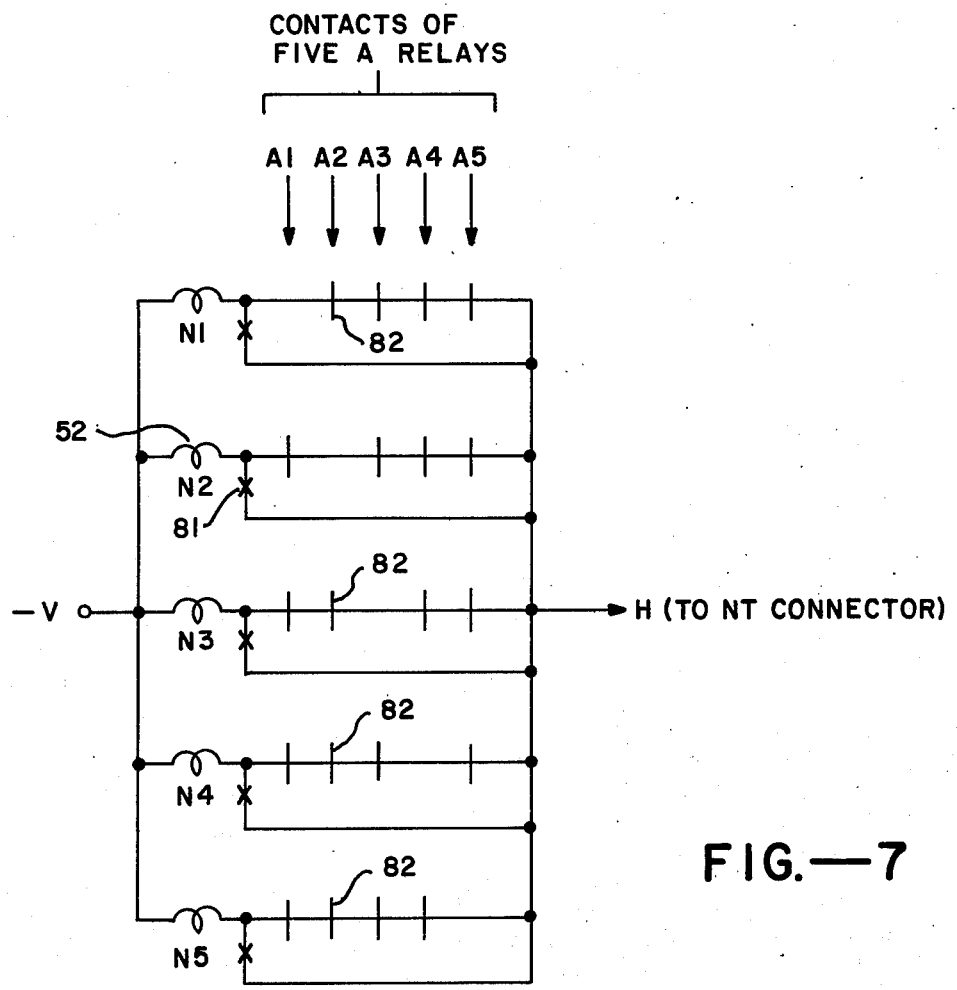
FIG.—7

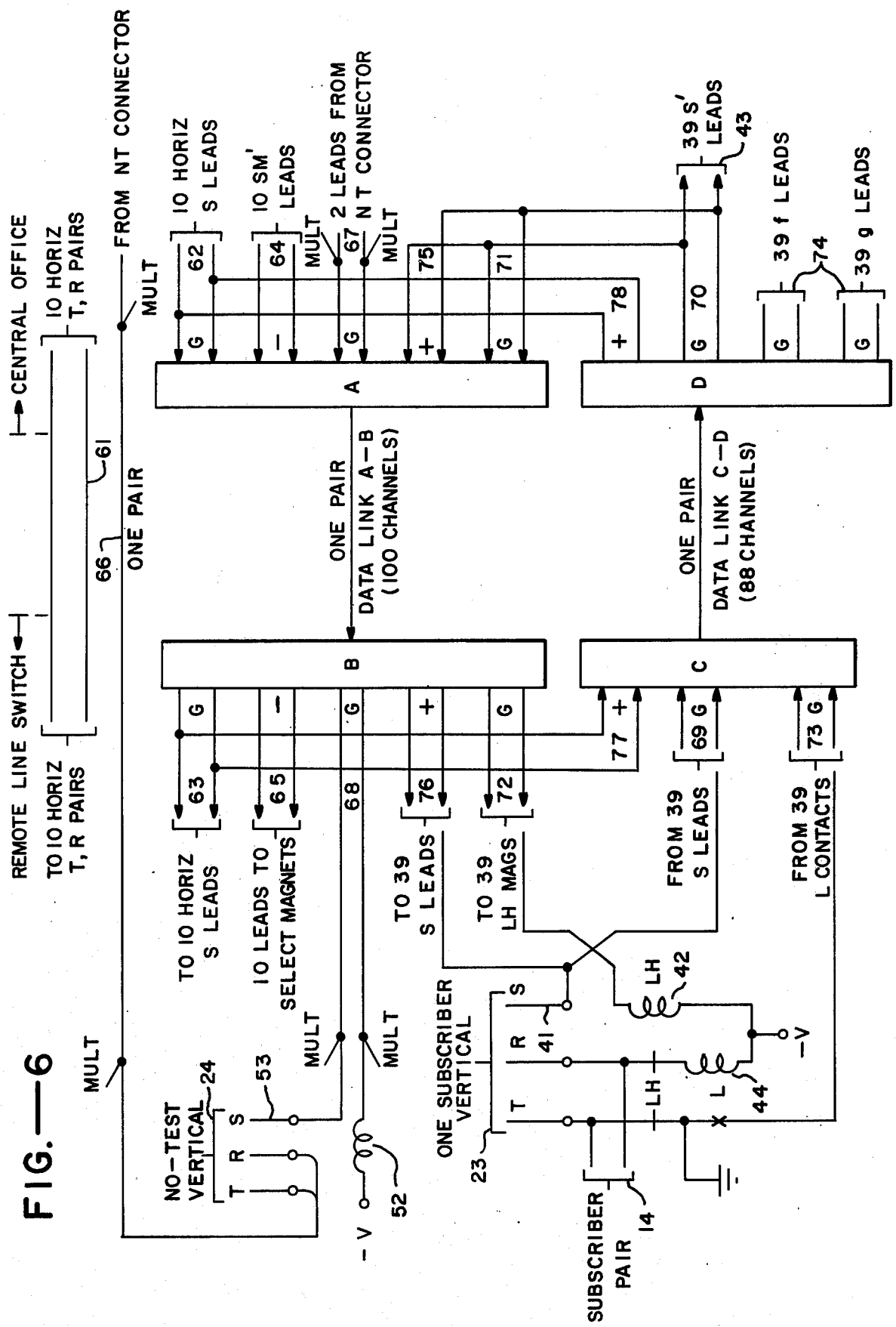

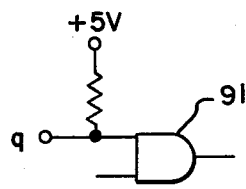 FIG.—8A
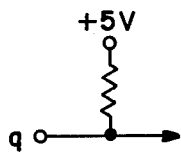 FIG.—8B 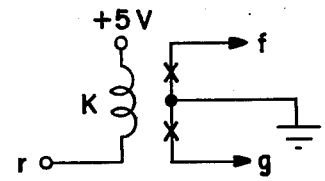
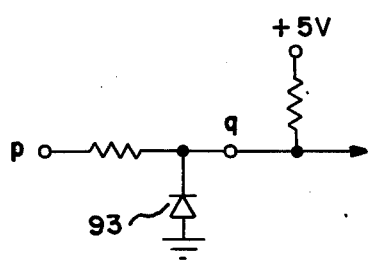 FIG.—8C 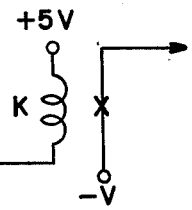
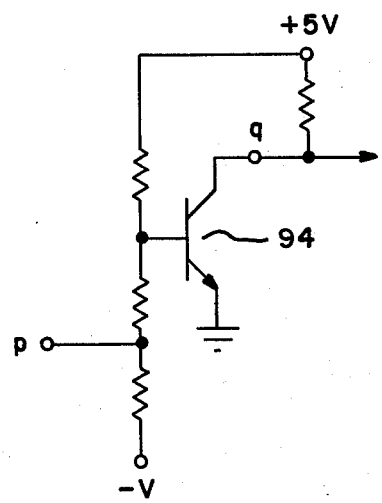 FIG.—8D 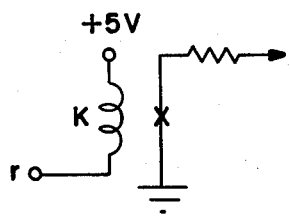
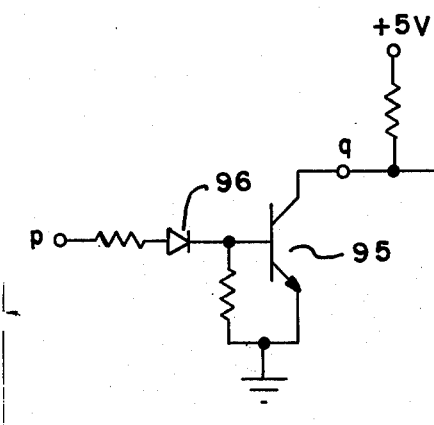 FIG.—8E 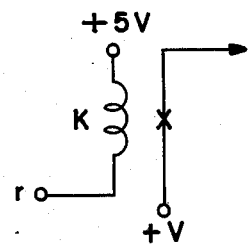

CENTRAL OFFICE SWITCHING SYSTEM WITH REMOTE LINE SWITCH

BACKGROUND OF THE INVENTION

This invention relates generally to telephone subscriber switching systems and more particularly to a subscriber system in which subscriber traffic is concentrated at a remote line switch portion of a central office switching system and passed between remote line switch portion and central office switching portion in concentrated form. The remote line switch is a concentrating portion of the central office switching network and is controlled by existing central office equipment over multichannel data links which forward status and control signals between the remote line switch and the central office.

In conventional telephone practice each subscriber telephone instrument is connected to the telephone central office by an individual pair of wires called the subscriber line (or loop). Particularly where long distances are involved, the cost of providing individual lines between a group of subscribers and the serving central office is high. Various means have been used to provide more economic alternatives. These means include subscriber carrier systems, subscriber concentrator systems, and combinations thereof.

A multichannel subscriber carrier system uses frequency division or time division multiplexing to provide many communication channels over one or two pairs of wire. Subscriber lines are individually connected to a remote carrier terminal, their corresponding central office "appearances" are connected to a central office carrier terminal, and the carrier system provides dedicated transmission channels between the two carrier terminals.

A subscriber concentrator system takes advantage of the fact that only a small fraction of a group of subscribers will require telephone service at a given time. Subscriber lines are individually connected to a remote concentrator terminal, their corresponding central office appearances are connected to a central office concentrator terminal, and the two terminals are connected to one another by pairs of wire or transmission channels called concentrator trunks. Because of the random statistics of subscriber service requirements, the number of concentrator trunks can be substantially less than the number of subscribers served by the concentrator system. Typical concentration ratios are of the order of four to one.

Each concentrator terminal contains a switch to selectively connect subscriber lines and corresponding central office line appearances to the concentrator trunks. The two switches must be operated cooperatively, such that when the central office concentrator switch connects a particular subscriber line appearance to a particular concentrator trunk the remote concentrator switch will connect the same concentrator trunk to the corresponding remote subscriber line. Therefore, the concentrator system requires a self-contained control system to control the operation of its two switches, and to recognize and respond to requests for subscriber connections (and disconnections) which may be initiated from either the remote terminal or the central office terminal. The concentrator control system requires additional transmission paths between the concentrator terminals.

A telephone central office switching machine also takes advantage of the fact that only a small fraction of the subscribers will require telephone service at a given time. When a subscriber concentrator system is associated with a central office switching machine, the combination includes an unnecessary duplication of function.

OBJECTS AND SUMMARY OF THE INVENTION

It is a general object of the present invention to provide a simple and economical subscriber system which performs the function of a subscriber concentrator system but eliminates the redundant de-concentrating and re-concentrating switching functions and switching equipment which occur at the interface between a subscriber concentrator system and the central office switching network of a conventional system.

It is another object of the present invention to provide a subscriber system which interfaces the central office switching network with concentrated subscriber traffic and which is directly controlled by existing central office equipment.

It is another object of the present invention to provide a subscriber system in which a concentrating portion of the central office telephone switching network is remotely located, in which subscriber traffic is passed to and from the remainder of the switching network at the central office via concentrated voice transmission paths and in which the remotely located concentrating portion of the telephone switching network is directly controlled by existing central office equipment via multichannel data links which forward status and control signals between the remotely located concentrating switch and the central office.

The foregoing and other objects of the invention are achieved by a system which includes a remote switch network which switches individual ones of a number of served subscribers to a lesser number of voice transmission paths which provide extended line-links between said remote switch network and a switch network at the central office and a two-way multichannel data transmission means which forwards status and control signals between the remote switch network and the central office switch network to provide concentration of subscriber traffic between the remote switch location and the central office under control of existing central office equipment.

BRIEF DESCRIPTION OF THE DRAWINGS

FIG. 1 is a block diagram of a typical central office switching machine to which the present invention pertains.

FIG. 2 is a schematic diagram of the line switch and the line-junctor switch of one horizontal group of one line-link frame of the central office switching machine of FIG. 1.

FIG. 3 is a schematic diagram showing the interconnection of the thirty select magnets of the horizontal group of FIG. 2.

FIG. 4 shows the connection of one subscriber line to one vertical circuit of the line switch of FIG. 2.

FIG. 5 shows the connection of the no-test connector to the no-test vertical of the line switch.

FIG. 6 is a diagram of the present invention as applied to a central office switching machine of the type shown in FIG. 1.

FIG. 7 is a diagram of a relay circuit to prevent double connections on no-test calls.

FIGS. 8A–8E show circuits suitable to interface the status and control signals of FIG. 6 with a particular multichannel data link.

DESCRIPTION OF THE PREFERRED EMBODIMENTS

Description of Telephone Central Office Switching Network and Function

The present invention applies to telephone subscriber switching machines in which each subscriber line has one appearance on the switching network. Such switching machines include the No. 5 Crossbar Switching machine, FIG. 1, which is widely deployed throughout the United States.

A crossbar telephone system is described in U.S. Pat. No. 2,585,904 issued Feb. 19, 1952 to Aloysius J. Busch. The switching network consists of up to 20 line-link frames 11 and up to 10 trunk-link frames 13 which are interconnected by junctors 12. The network provides switched paths between subscriber lines 14 connected to the line-link frames and trunks or registers 15 connected to the trunk-link frames. When a path is required, a system common marker 16 is called to select and establish the path. The marker then retires and the path is held, and later released, by the trunk or register. A marker is not required to hold or release a path. The common markers connect as needed to the line-link frames through the line-link marker connector 17 and the line-link frame connector 18. Each line-link frame provides full access switching between typically 500 subscriber lines and 100 junctors. Each line-link frame 11 is a two-stage switching network and the connecting paths between the two stages are called line-links. The first stage consists of ten switch units, each of which provides full-access switching between typically 50 lines and 10 line-links. The second stage consists of 10 more switch units, each of which provides full access switching between 10 line-links and 10 junctors. The 100 line-links between the two stages are connected so that any of the 500 subscriber lines 14 has full access to any of the 100 junctors 12. Note that in this arrangement there is a five to one concentration of subscriber lines to line-links in each first stage switch unit, but no concentration in the second stage switch units. The number of line-links between the first and second stages is equal to the number of junctors connected to the line-link frame. The second switching stage of the line-link frame performs a distributing function rather than a concentration function.

From the foregoing it is evident that, when a subscriber concentrator system is associated with a central office switching machine of the type described, the combination contains an unnecessary duplication of function, because the central office terminal of the concentrator system "de-concentrates" the concentrator trunks to subscriber line appearances, while the first stage switch units of the line-link frame "reconcentrate" the subscriber line appearances to line-links. The combination would work equally well if the concentrator trunks were connected directly to the line-links, thereby eliminating the central office terminal of the subscriber concentrator system and the switch unit in the first stage of the line-link frame 11.

Each line-link frame 11 contains ten rows of crossbar switches with two, three, or for switches per row. FIG. 2 is a schematic diagram of one such row of three crossbar switches. Each row comprises one line switch 25 and one line-junctor switch 26. On each line-link frame the 10 line switches and the 10 line-junctor switches are interconnected by line-links 21.

Each crossbar switch is a 10×20 unit consisting of 10 horizontal circuits 22 (horizontals or levels) with 10 corresponding "select" magnets, and 20 vertical circuits 23 (verticals) with 20 corresponding "hold" magnets. Each of these circuits is a three-wire circuit consisting of three conductors designated tip, ring, and sleeve (T, R, and S). The T,R pair provides the talking path and the S lead provides a holding path through the network. A three-wire connection between any level and any vertical is made by marker operation of the corresponding select and hold magnets in the sequence (1) operate select magnet and (2) Operate hold magnet. The connection "makes" when the hold magnet operates. The select magnet releases when the marker retires, but the switch connection is maintained by the hold magnet which remains operated over the network S lead. A subsequent connection between the same level and a different vertical can be made as above, but it is not possible to make a subsequent connection to a connected vertical. Any connection is broken by releasing the corresponding hold magnet. The select magnet is not involved in the breaking of a connection.

The set of subscriber lines connected to one line switch is called a horizontal group, and the corresponding row of crossbar switches is generally referred to as a horizontal group. In each horizontal group the corresponding levels of adjacent crossbar switches are connected through, as in FIG. 2, and the three select magnets 31 on each level, (FIG. 3) are connected to operate in parallel through a pair of make contacts 32 of the HGA relay associated with that horizontal group. To operate the select magnets on one level of one horizontal group, the marker (via the line-link frame connector) operates the HGA relay of the selected horizontal group and applies negative battery to the selected one of the 10 SM leads 33 of FIG. 3.

In each horizontal group one end-switch is "split", i.e. its levels are severed between the 10th and 11th verticals (see FIG. 2). This arrangement provides the equivalent of two switches: one having 10 levels and 10 verticals, the other having 10 levels and 50 verticals. These two switches share the same select magnets. The 10×10 switch is called the line-junctor switch (LJ switch) and its 10 verticals connect to junctors 12. The other switch is called the line switch and 49 of its 50 verticals connect to 49 subscriber lines 14. The remaining vertical, called "no-test" vertical 24, is reserved for administrative purposes. It provides access, via any level, to any of the 49 subscriber lines without being denied access by a line-busy condition. Customarily, the no-test vertical is the first vertical on the crossbar switch adjacent to the split switch.

In normal practice, horizontal groups are equipped for from 19 to 59 lines according to subscriber traffic activity. FIG. 2 illustrates a 49-line horizontal group. The corresponding line-link frame 11 serves 490 subscribers.

The 10 rows of crossbar switches on the line-link frame comprise 10 line switches 25 and 10 LJ switches 26. One hundred line-links 21 cross-connect the 100 levels of the 10 line switches to the 100 levels of the 10 LJ switches. The line-link cross-connect pattern is that level $x$ of line switch $y$ connects to level $y$ of LJ switch x. By this means any of the 490 lines 14 on the frame 11 can be connected to any of the 100 junctors 12 on the frame by connecting the two verticals (line and junctor) to that one line-link 21 which connects the particular line switch to the particular LJ switch. This line-link determines the level on each switch. For example, the connection of any line on line switch No. 3 to any junctor on LJ switch No. 8 requires the one line-link between level No. 8 of line switch No. 3 and level No. 3 of LJ switch No. 8. Therefore, the connection requires marker operation of select magnets for both levels, and these two are wired in parallel. More specifically, the select magnets 31 of the 10 split switches are multiplied 34 such that select magnet $x$ of split switch $y$ is connected to select magnet $y$ of the split switch $x$. It is noted that in the above example the select magnets will also activate level No. 8 of LJ switch No. 3 and level No. 3 of the split portion of line switch No. 8. However, a second line-to-junctor connection is not made because the marker does not operate hold magnets on verticals of these switches.

FIG. 4 shows the connection of one subscriber line 14 to one vertical circuit 23 of the line switch 25. The tip and ring conductors of the line pair connect directly to the T,R pair of the vertical. The S lead 41 of the vertical connects to the line-hold magnet LH 42 and also extends (as lead S' 43) through various relay contacts to the line-link frame connector 18. The marker can operate LH by placing ground on lead S'. Having operated to complete a network path, LH finds ground on the vertical S lead 41 and remains operated after the marker retires. The ground so held on S' marks the line busy to subsequent tests by the marker. The ground on S' is also used for other purposes such as subscriber message accounting, etc. The LH magnet 42 has two break contacts which connect the tip lead to ground and the ring lead to line relay L 44. The line relay has two make contacts which provide ground on two leads, $f$ and $g$, which extend through various relay contacts to the line-link marker connector 17 and the line-link frame connector 18. These grounds call the marker to a calling line and help it identify the location of the calling line on the line-link frame.

With his LH magnet 42 released, a calling subscriber going off-hook operates his line relay L 44 over his line conductors 14. The make contacts of L ground the $f$ and $g$ leads to call the marker 16. The marker identifies the calling line and prepares a network path from an originating register 15 on the trunk-link frame to a level 22 on the line switch. The path is completed when the marker operates LH by placing ground on S' 43. The originating register provides the holding ground for LH (and S') over the network S lead, and the marker retires. The break contacts of LH disconnected ground and line relay L 44 from tip and ring, so the make contacts of L open and remove ground from the $f$ and $g$ leads. The register 15 provides dial tone to the calling line 14 over the network path and the subscriber dials into the register. The connection is released when the register removes ground from the network S lead. Subsequently the marker reconnects the calling line through the network to an intra-office or outgoing trunk circuit 15.

Alternatively, to complete a call toward a subscriber line the marker tests the subscribers S' lead 43 for ground or not (busy or idle). If the S' lead is on-ground the marker connects the calling line to a tone trunk 15 which provides busy-tone to the calling party. The marker retires. If the S' lead is off-ground, the marker prepares a network path from the appropriate intra-office or incoming trunk circuit 15 to a level 22 of the line switch, then operates LH 42 by placing ground on S'. The trunk circuit provides the holding ground for LH (and S') over the network S lead. The marker retires. Operation of LH disconnected ground and the line relay 44 from tip and ring. The trunk circuit applies ringing voltage through the network T,R leads to the subscriber line 14. The connection is released when the trunk circuit removes ground from the network S lead.

A telephone operator can connect to a subscriber line, whether busy or not, by placing a "no-test" (NT) call toward the subscriber. The NT call is routed via a NT trunk which can access the line-link frame 11 via junctors 12 from the trunk-link frame or, alternatively, via a NT connector circuit 51, FIG. 5. If the called line is idle, the NT call is completed as a regular call. If the called line is busy, the NT call proceeds as a regular call up to the point when the marker tests the subscribers S' for 43 for ground or not. When the marker finds ground, it applies positive battery to the S' lead 43 in order to mark the S lead of that level 22 (one of 10 on the line switch) connected to the busy line. The marker then tests the 10 horizontal S leads, finds the marked level, and operates the corresponding select magnets 31. (The grounded S' and S leads can support positive battery because the holding ground from the serving circuit on the trunk-link frame is provided through a series resistance.) The marker also causes the NT connector 51 to connect the NT trunk to the NT vertical 24 of the line switch and to operate the NT vertical hold magnet 52. This completes a connection from NT trunk to called line via NT connector, NT vertical 24, and that level 22 already connected to the busy subscriber line. The marker retires. The NT vertical hold magnet 52 remains operated by ground extended from the NT trunk through the NT connector. The S lead 53 of the NT vertical 24 is not connected to the NT vertical hold magnet, but is wired to the NT connector. This arrangement enables the NT trunk to disconnect the NT call, or to hold (via ground on the NT vertical S lead) the called subscriber after the other party hangs up.

In common practice the ten NT verticals 24 on one line-link frame 11 are multipled 54 such that the five NT verticals for the upper five horizontal groups are connected in parallel, and the five NT verticals of the lower five horizontal groups are connected in parallel. This arrangement permits only one NT call to five horizontal groups. Each NT call operates and holds five NT vertical hold magnets 52 but only one connection is made because the select magnets are operated in only one horizontal group. This is why the NT verticals 24 are not assigned on the split switch portion of the line switch 25. If they were so assigned, a double connection would result because the select magnet multiple 34 (shown in FIG. 3) causes select magnets to operate simultaneously on two split switches.

The NT verticals are also used for routine insulation test of subscriber lines. The test control circuit obtains access to the (idle) subscriber line through the NT connector by connecting both the line vertical 23 and the NT vertical 24 to an idle level 22 of the line switch.

Remote Line Switch System

The remote line switch system in accordance with the present invention is formed by partitioning FIGS. 2 and 3 at line X—X. Equipment to the right of X—X remains in the central office and equipment to the left of X—X (or equivalent apparatus), conventionally at the central office, is removed to the remote location. Conceptually, the line switch 25 can be partitioned between any two verticals. However, practical considerations of existing switch arrangements suggest the partition shown in FIGS. 2 and 3. The remaining verticals to the right of X—X can be assigned to local subscribers. The no-test circuit may or may not be reassigned from the vertical 24 shown in FIG. 2 to one of the 10 verticals to the right of X—X. If not reassigned, a no-test circuit must be extended from the central office to the remote location. If the no-test vertical is reassigned, there is the problem of double connections described previously. However, this problem can be eliminated by the addition of a simple relay circuit at the central office, as will be described later.

The central office and the remote line switch are connected by the equipment shown in FIG. 6, consisting of metallic pairs and two binary data links. Each binary data link consists of a scanning terminal with many inputs and a distributing terminal with corresponding outputs. The input and output signals are binary in nature, e.g. ground or no-ground, battery or no-battery. The scanning terminal scans its many inputs, converts each input signal to binary code (0 or 1, pulse or no-pulse), assembles the coded inputs and a unique framing code in time division multiplex, and transmits the composite signal as a serial bit stream over one conductor pair to the distributing terminal. The distributing terminal synchronizes on the unique framing code, demultiplexes the incoming information bits, converts the coded information to original form (e.g. ground or no-ground, battery or no-battery), and provides the corresponding conditions at its corresponding output terminals. Such binary data links are well-known. For example, a Futronix 1A System, Futronix Corp., Sunnyvale, California, may be employed, as will be described below.

In FIG. 6 there are three types of data channels, those which forward ground or no-ground, those which forward negative battery or not, and those which forward positive battery or not. To facilitate understanding of FIG. 6, the inputs and outputs of the data channels are marked with like symbols (G, —, or +) according to their type.

In FIG. 2, X—X cuts 30 conductors: 10 horizontal T,R pairs and 10 horizontal sleeves. The 10 T,R pairs are extended as metallic pairs 61 from the central office to the remote line switch. The 10 horizontal S leads at the central office are connected to 10 inputs 62 of scanning terminal A. The corresponding 10 outputs 63 of distributing terminal B are connected to the 10 horizontal S leads of the remote line switch. These 10 channels of data link A-B forward resistance ground or no-ground from S leads at the central office to S leads at the remote line switch.

In FIG. 3, X—X cuts 10 conductors to select magnets. These conductors at the central office (SM' leads in FIG. 6) are connected to another 10 inputs 64 of A. The corresponding 10 outputs 65 of B are connected to the 10 select magnets of the remote line switch. These 10 channels of data link A-B forward negative battery or no-battery from SM' leads at the central office to select magnets 31 at the remote line switch.

In FIG. 6 the no-test vertical 24 of the horizontal group is assigned on the remote line switch as shown, and one metallic pair 66 is required to extend the tip and ring conductors of the no-test circuit from central office to remote line switch. The no-test circuit also includes two leads which provide ground or no-ground from the no-test connector to the S lead 53 and hold magnet 52 of the no-test vertical. These two leads at the central office are connected to two inputs 67 of scanning terminal A. The corresponding two outputs 68 of distributing terminal B connect to the S lead and hold magnet of the no-test vertical. As indicated in FIG. 6, the four leads of the no-test circuit may be multipled to the no-test verticals of other horizontal groups at either the central office end or the remote line switch end.

FIG. 6 also shows the connection of one remote subscriber line 14 to one vertical 23 of the remote line switch. The S lead 41 of each vertical connects to an input 69 of scanning terminal C, and the line hold magnet LH 42 for each vertical connects to an output 72 of distributing terminal B. The corresponding outputs 70 of terminal D and inputs 71 of terminal A are connected together, and to the subscriber S' leads 43 which are located at the central office. These 39 data channels in each direction forward resistance ground or no-ground from vertical S leads at the remote line switch to S' leads at the central office, and from S' leads at the central office to LH magnets at the remote line switch.

In FIG. 6, as in FIG. 4, ground and the line relay L 44 connect to tip and ring of the remote subscriber pair through break contacts of the LH magnet. Each line relay has a make contact through which ground connects to an input 73 of scanning terminal C. The second make contact shown in FIG. 4 is not required. The corresponding outputs 74 of distributing terminal D connect to subscriber $f$ and $g$ leads which are located at the central office. That is, each $f$ lead connects to one output and the associated $g$ lead connects to a second parallel output of the same channel of data link C-D. These 39 data channels forward ground or no-ground from subscriber line relays 44 at the remote line switch to corresponding subscriber $f$ and $g$ leads at the central office.

In order to accommodate no-test calls FIG. 6 includes another 39 channels 75, 76 over data link A-B to forward positive battery or no-battery from the 39 subscriber S' leads at the central office to the S leads 41 of the subscriber verticals 23 at the remote line switch. Positive battery applied to a vertical S lead will appear on one of the 10 horizontal S leads at the remote line switch and must reappear on the corresponding horizontal S lead at the central office. Therefore, FIG. 6 includes 10 channels 77, 78 over data link C-D to forward positive battery or no-battery from horizontal S leads at the remote line switch to horizontal S leads at the central office.

With this arrangement the central office can complete calls from or to subscribers at the remote line switch in exactly the same manner as already described for local subscribers. Furthermore, the completed connection provides a T,R path which is metallic all the way from remote subscriber instrument to central office trunk-link frame equipment. Therefore, there is no requirement for talking battery supply, or ringing equipment, or dial repeating equipment at the remote line switch.

The remote line switch requires DC power to operate its select, hold, and line relays and to power the data link terminals B and C. Power can be supplied by local battery, or from the central office over "express" pairs, or by simplex feed over the data link pairs. The power requirements are modest because:

a. a line relay 44 operates only momentarily at the beginning of an originating call,
b. select magnets 31 operate only momentarily to initiate a network connection,
c. at most, only 10 line-hold magnets 42 are operated at any time. This is a maximum traffic condition which seldom occurs. Most of the time there are fewer line-hold magnets operated.

Operation of Remote Line Switch

The remote line switch operates as follows. With his LH magnet 42 released, a calling remote subscriber going off-hook operates his line relay 44 over his line conductors 14. The make contact of L places ground on an input of C. This condition is forwarded through data link C-D 73,74 and D applies ground on the corresponding $f$ and $g$ leads to call a marker. The marker identifies the calling line and prepares a network path from an originating register on the trunk-link frame to a level on the line switch. The T,R pair of this path extends directly via metallic pair 61 from the central office to the level 22 of the remote line switch. In preparing the network path the marker has connected negative battery to an SM' lead at the central office, i.e. to an input of A. This condition is forwarded over data link A-B 64,65 and B applies negative battery to operate the corresponding select magnets 31 of the remote line switch. The originating register provides resistance ground through the network S lead to an input of A. This condition is forwarded through data link A-B 62,63 and B applies resistance ground to the corresponding horizontal S lead at the remote line switch. Thus the S lead of the network path is extended to a level of the remote line switch. The marker completes the network path by applying ground to the remote subscribers S' lead at the central office, i.e. to an S' input of A. This condition is forwarded through A-B, 71,72 and B applies ground to the remote subscribers LH magnet 42. LH operates and connects the subscribers vertical to the selected level. This connection extends the ground on the horizontal S lead to the vertical S lead 41 and the S lead input of C. C-D 69,70 forwards the ground to D which applies ground to the remote subscribers S' lead 43 at the central office. This ground returns through A-B 71,72 and maintains the LH magnet operated, which sustains the ground on S' (at the central office) for busy-test, etc. The marker retires. When LH is operated, its break contacts disconnected ground and the line relay 44 from tip and ring, so the make contact of L opens to remove ground from the input to C and, via C-D 73,74 from the f and g leads at the central office.

The connection is released when the originating register removes ground from the network S lead. This removes ground from the S lead input of A which, via A-B 62,63 removes ground from the S lead output of B. This removes ground from the S lead input to C which, via C-D 69,70 removes ground from the S' output of D. This removes ground from the S' input of A which, via A-B 71,72 releases LH.

Alternatively, to complete a call toward a remote subscriber the marker tests the subscribers S' 43 lead at the central office for ground or not (busy or idle). If the S' lead is off-ground the marker prepares a network path from the appropriate trunk circuit to a level of the line switch and completes the path by applying a ground to lead S'. The sequence of events is the same as that just described for completing and holding a network path to a calling remote subscriber. The connection is released when the trunk circuit removes ground from the network S lead, and the release sequence is the same as that described above.

To complete a no-test call to a busy subscriber line the marker tests the subscriber S' lead 43 at the central office and, finding ground, applies positive battery to the S' lead. This condition is forwarded over data link A-B 75,76 and B applies positive battery to the subscribers vertical S lead 41. Because the busy subscriber is connected to a horizontal level of the remote line switch, positive battery appears on the corresponding horizontal S lead and is forwarded via data link C-D 77,78 to the corresponding horizontal S lead at the central office. At the central office the marker tests the horizontal S leads for positive battery, finds the marked level, and applies negative battery to the corresponding SM' lead. This condition is forwarded over data link A-B 64,65 and operates the corresponding select magnet at the remote line switch. The marker also causes the no-test connector to provide grounds on two leads towards the NT vertical circuit. These grounds are forwarded over two channels of data link A-B 67,68 which provide grounds to the S lead 53 and hold magnet 52 of the NT vertical 24 at the remote line switch. This completes the NT call to the busy subscriber line. The talking path for the NT call is over the metallic pair 66 extending from NT connector at the central office to NT vertical at the remote line switch. The NT call is released when the NT connector removes ground on the two leads toward the NT vertical circuit which, via data link A-B 67,68 remove ground from the S lead and hold magnet of the NT vertical at the remote line switch.

If, in FIG. 2, the no-test vertical is reassigned from the left to the right of partition X—X, then the one metallic pair 66 and the two A-B data channels 67,68 provided for no-test calls can be omitted from FIG. 6. This reassignment frees a vertical at the remote line switch for assignment to another subscriber, but it also shifts the NT vertical 24 onto the split switch at the central office and thereby creates the problem of double connections as discussed previously. This problem is solved by the arrangement shown in FIG. 7. In FIG. 7 the coils marked N are the hold magnets 52 of the NT verticals 24, one in each of the five horizontal groups which share the same no-test circuit. Each N magnet requires one make contact 81. Each vertical set of four break contacts 82 marked A are contacts of an auxiliary relay connected in parallel with each of the five HGA relays (see FIG. 2). The A relays are slow release.

Assume all N magnets are released, and a no-test call is placed to a busy subscriber in remote horizontal group No. 2. The A2 relay operates with the HGA relay for group No. 2 and thereby opens series contacts 82 to N1, N3, N4, and N5. The marker places ground on lead H and only N2 operates, making the NT connection to the marked level in group No. 2. N2 latches via its make contact 81. When the HGA relay and A2 relay release, the other four N magnets operate and latch, but no double connection results because the select magnets have released before the A2 contacts close. All N relays remain operated until ground is removed from the H lead.

If the NT vertical is shifted to the central office as explained above, then the new subscriber added to the remote line switch requires two additional channels over data link C-D for his S lead and line relay. He also requires two channels over data link A–B but these become available when the NT vertical is shifted. Thus, to serve 40 remote subscribers the remote line switch requires 100 channels on data link A–B and 90 channels on data link C–D.

From the foregoing description of the remote line switch system it is evident that all central office operations to service calls to and from remote subscribers are exactly the same as for local subscribers. Furthermore, the remote line switch system also accommodates no-test calls and routine line insulation testing via the no-test circuit.

The remote line switch has been described in terms of 39 or 40 remote subscriber lines in one horizontal group, for which data link A–B requires 100 channels and data link C–D requires 88 or 90 channels. If the subscriber traffic is low, a third crossbar switch can be added to serve a total of 59 or 60 lines at the remote line switch. This would require a total of 140 channels for data link A–B and 128 or 130 channels for data link C–D.

A larger number of remote lines can be served by extending two or more horizontal groups to remote line switches. If these are co-located, they can share a common A–B data link and a common C–D data link. For example, if all 10 horizontal groups of a line-link frame are extended to a remote location, and if each remote group serves 60 lines, then the common data link A–B requires 1400 channels and the common data link C–D requires 1300 channels.

The binary conditions transmitted over the data link channels arise from the operation and release of telephone magnets and relays with typical operate and release times of many milliseconds. Furthermore, the condition on any one channel changes state only occasionally. Where sequential operations must be reproduced in proper sequence (e.g. operate select magnet, then operate LH magnet), a relative timing tolerance of a few milliseconds is adequate. For these reasons, the serial digital transmission rate between the data link terminals can be held to low rates by transmitting information only when there is a change in a channel condition, i.e. by transmitting channel number and new state, plus error protection.

On the other hand, the T1 digital line (manufactured by Western Electric Co. and others) is a very low cost digital transmission facility with a capacity of 1.544 megabits per second. Using this digital line, even the 1400 channel data link cited above can be assigned more than 1000 bits per second to each channel. This is a grossly inefficient use of transmitted bits, but very economical because the T1 line is cheap and and the data terminals are simplified because they can use full-time transmission of present state in each channel.

The operating range of the remote line switch can be extended by equipping the metallic T,R pairs at the central office with conventional "loop extenders" and two-way voice frequency amplifiers (e.g. E-type repeaters). This is very economical because only 10 such equipments per horizontal group serve all of the remote subscribers.

In other cases it may be desirable to substitute a telephone carrier system for the metallic T,R pairs between central office and remote line switch, and assign these talking paths to the voice channels of the carrier system. In this case the carrier system must provide talking battery for remote subscribers, and must repeat ringing signals toward subscribers, and dial pulsing toward the central office. Conventional subscriber carrier systems are already equipped to perform these functions. Additional carrier channels can be equipped to provide the digital transmission paths for the data links. For example, a single voice channel of a PCM subscriber carrier system can be modified to provide at least 56 kilobits per second of digital transmission capacity.

The remote line switch has been described in terms of its application to telephone central offices equipped with crossbar switching machines. However, the remote line switch concept is applicable to any switching machine having a switching network in which each subscriber line has only one "appearance" on the network. Such switching machines include the so-called "electronic switching systems" designated ESS No. 1, No. 2, and No. 3 manufactured by Western Electric Company. In such applications the switch units at the remote location would preferably be of the type used in the central office switch, e.g. "ferreed" or "remreed" switch units for ESS machines.

Data Links for Remote Line Switch

The remote line switch system requires multichannel data links from central office to remote location and from remote location to central office to forward control and status signals between the two portions of the switching network. The multichannel data links can be provided by means of a Futronix 1A System, manufactured and sold by Futronix Corporation, 940 East Arques Avenue, Sunnyvale, California 94086.

The Futronix system uses digital transmission at 1.544 Mb/s over a T1 repeatered line. In its maximum channel configuration it provides 7140 channels with a per channel transmission rate of 173 bist/sec. Various other configurations are available; e.g. 868 channels with per channel transmission rate of about 1400 bits/sec.

The Futronix system uses conventional transistor-transistor logic (TTL) operating from +5 volt power supply. The input and output circuits of any data channel are shown in FIG. 8A. The input terminal $q$ is the input lead of a TTL gate 91 connected through a 10,000 ohm pullup resistor to +5 volts. The output terminal $r$ is the output lead of a TTL gate 92. For each data channel the logic state of output terminal $r$ conforms to the logic state of the corresponding input terminal $q$. FIGS. 8B, 8C, 8D, and 8E show simple circuits to interface the inputs and outputs of the Futronix data channels to the data inputs and outputs of the remote line switch system shown in FIG. 6.

FIG. 8B shows the interface for the C–D data channels 73,74 which forward open or ground from the make contact of line relay L at the remote line switch to $f$ and $g$ leads at the central office. The L relay 44 applies open or ground to terminal $q$, i.e. logic 1 or 0 to the data channel. Logic 1 or 0 at terminal $r$ causes relay K to release or operate. The two make contacts of K apply open or ground to the $f$ and $g$ leads.

FIG. 8B also applies to the two A–B data channels 67,68 which forward open or ground from the NT connector in the central office to the hold magnet and sleeve of the NT vertical circuit at the remote line switch. In this case relay K requires only one make contact and the ground may be resistance ground as in FIG. 8D. FIG. 8C shows the interface for the A–B data channels 64,65 which forward open or negative battery from SM' leads at the central office to select magnets at the remote line switch. An SM' lead applies open or negative battery to terminal $p$. For open at $p$, $q$ is logic 1. Negative battery at $p$ pulls current from ground through the diode 93 and thereby drops the voltage at $q$ to logic 0. The K relay applies open or negative battery to the select magnets at the remote line switch.

FIG. 8D shows the interface for the following data channels of FIG. 6:

a. the A-B channels 62,63 which forward resistance ground from horizontal S leads at the central office to horizontal S leads at the remote line switch;

b. the A-B channels 71,72 which forward resistance ground from S' leads at the central office to LH magnets at the remote line switch; and c. The C-D channels 69,70 which forward resistance ground from vertical S leads at the remote line switch to S' leads at the central office.

In each case the condition applied to terminal $p$ is open, resistance ground, or positive battery applied on resistance ground. For open at terminal $p$, the base of transistor 94 is biased to prevent conduction and terminal $q$ is logic 1. Resistance ground or positive voltage at terminal $p$ allows the base to move positive, the transistor saturates, and terminal $q$ is logic 0. The K relay applies open or resistance ground to the horizontal S lead, LH magnet, or S' lead.

FIG. 8E shows the interface for the following data channels of FIG. 6:

a. the A-B channels 75,76 which forward positive battery from S' leads at the central office to vertical S leads at the remote line switch; and b. the C-D channels 77,78 which forward positive battery from horizontal S leads at the remote line switch to horizontal S leads at the central office.

In each case the condition applied to terminal $p$ is open, resistance ground, or positive battery applied on resistance ground. For open or resistance ground at terminal $p$ the transistor 95 is non-conducting and terminal $q$ is logic 1. For positive battery at terminal $p$ the transistor saturates and terminal $q$ is logic 0. The K relay applies open or positive battery to vertical or horizontal S leads. The series diode 96 of FIG. 8E prevents current flow from ground to terminal $p$. Otherwise the input circuit of FIG. 8E could apply resistance ground to the input circuit of FIG. 8D, for these two types of data channels are connected in parallel in FIG. 6.

The extended line-links (and transmission paths of the two-way data link) between the remote line switch and the serving central office can be individual cable pairs or transmission channels of a multi-channel carrier system. In the latter case there may be provided additional savings in the transmission cost. When the extended line-links are physical pairs, the talking battery and ringing voltage to remote subscribers are supplied directly from the central office. If the extended line-links are carrier channels, the talking battery and ringing voltage for remote subscribers must be supplied at the remote terminal under control of the carrier channel.

The remote line switch system performs the same function as a conventional subscriber concentrator system. However, the concentrator system requires complementary switching units at the remote location and at the serving central office, plus a self-contained control system with control channels between the terminals. The system in accordance with the present invention requires a switching unit at the remote location, but does not require a complimentary switching unit at the serving central office. It eliminates a portion of the central office switching network which would otherwise be required. The remote line switch system is controlled by the central office switching machine over a two-way multi-channel data link which conveys status and control signals between the remote location and the serving office.

What is claimed is:

1. A telephone subscriber system including remotely located switch units which provide full-access switching of individual ones of a number of remotely located subscriber lines to a lesser number of line-links, transmission paths providing extended line-links between said remote switch units and a serving central office, switch units at said central office providing switching of line-links to junctors, and a two-way multichannel data transmission means connected between said remote switch units and said serving central office to transmit status and control signals between the remote switch units and the serving central office whereby said serving central office controls switching of remote subscribers lines.

2. A central office switching system with remote line switch in which a switch portion of the central office switching equipment normally serving to concentrate the local subscribers and connect them to a lesser member of line-links is located at a subscriber location remote from the central office to serve and provide full access to remote subscriber lines, transmission path means for extending said line-links between said remote switch portions and the central office and data links serving to transmit status and control signals between said remote switch portions and the central office whereby the central office controls the switching of subscribers connected to the remote switch portion.

3. A central office switching system with remote line switch as in claim 2, in which a no-test circuit serving the remote subscribers is located at the central office portion of the switching system.

4. A central office switching system with remote line switch as in claim 2, in which a no-test circuit serving the remote subscribers is located at the remote switch portion and a no-test transmission path is provided between the central office and the remote switch portion.

5. A central office switching system with remote line switch as in claim 2 in which said data links comprise two data links each including a scanning terminal and a distributing terminal with the scanning terminal of the first data link located at the remote switch portion and serving to transmit signals to a distributing terminal located at the central office and with the scanning terminal of the second data link located at the central office and serving to transmit signals to a distributing terminal located at the remote switch portion.

6. A central office switching system with remote switch portion as in claim 5 in which the data links serve to transmit information corresponding to ground or not, negative battery or not, and positive battery or not.

7. A central office switching system with remote line switch as in claim 5 wherein the inputs to the scanning terminal of said first data link comprises ground or not from the contacts of remote subscriber line relays, ground or not from vertical S leads, and positive battery or not from horizontal S leads at the remote switch portion location, wherein the outputs from the corresponding distributing terminal at the central office location comprise ground or not to $f$ and $g$ leads, ground or not to S' leads, and positive battery or not to horizontal S leads, wherein the inputs to the scanning terminal of said second data link comprise ground or not from horizontal S leads, negative battery or not from SM' leads, positive battery or not from S' leads, and ground or not from S' leads at the central office location, and wherein the outputs from the corresponding distributing terminal at the remote switch portion location comprise ground or not to horizontal S leads, negative battery or not to select magnets, positive battery or not to vertical S leads, and ground or not to line-hold magnets.

8. A central office switching system with remote line switch as in claim 5 wherein the inputs to the scanning terminal of said first data link comprise ground or not from the contacts or remote subscriber line relays, ground or not from vertical S leads, and positive battery or not from horizontal S leads at the remote switch portion location, wherein the outputs from the corresponding distributing terminal at the central office location comprise ground or not to $f$ and $g$ leads, ground or not to S' leads, and positive battery or not to horizontal S leads, wherein the inputs to the scanning terminal of said second data link comprise ground or not from horizontal S leads, negative battery or not from SM' leads, ground or not from the no-test connector, positive battery or not from S' leads, and ground or not from S' leads at the central office location, and wherein the outputs from the corresponding distributing terminal at the remote switch portion location comprise ground or not to horizontal S leads, negative battery or not to select magnets, ground or not to the no-test vertical circuit, positive battery or not to vertical S leads, and ground or not to line-hold magnets.

* * * * *

REEXAMINATION CERTIFICATE (218th)

United States Patent [19]

Boxall

[11] B1 4,038,498

[45] Certificate Issued Jul. 17, 1984

[54] CENTRAL OFFICE SWITCHING SYSTEM WITH REMOTE LINE SWITCH

[76] Inventor: Frank S. Boxall, 380 Eleanor Dr., Woodside, Calif. 94062

Reexamination Request:
No. 90/000,384, May 26, 1983

Reexamination Certificate for:
| | |
|---|---|
| Patent No.: | 4,038,498 |
| Issued: | Jul. 26, 1977 |
| Appl. No.: | 676,542 |
| Filed: | Apr. 12, 1976 |

[51] Int. Cl.³ .............................................. H04Q 3/60
[52] U.S. Cl. ................................................ 179/18 FC
[58] Field of Search ...................... 179/18 FC; 370/56

[56] References Cited

U.S. PATENT DOCUMENTS

| | | | |
|---|---|---|---|
| 2,894,072 | 7/1959 | Abbott, Jr. et al. | 179/18 FC |
| 3,022,382 | 2/1962 | Ewin | 179/18 FC |
| 3,123,674 | 3/1964 | Brooks et al. | 179/18 FC |
| 3,217,109 | 11/1965 | Abert | 179/18 FC |
| 3,389,229 | 6/1968 | Torisu | 179/18 FC |
| 3,433,901 | 3/1969 | Reinig | 179/18 FC |
| 3,917,908 | 11/1975 | Galluccio | 179/18 FC |

OTHER PUBLICATIONS

"An Experimental Remote Controlled Line Concentrator", A. E. Joel, Jr., *Bell System Tech. Journal*, vol. 35, No. 2, Mar. 1956, pp. 249–293.

"Fundamental Principles of Switching Circuits and Systems", AT&T Co., 1961, PP. 157–161.

"Distributed Line Concentrator with Unique Intraconcentrator Completion Circuits", C. E. Brooks, J. L. Henry, G. E. Markthakr, W. C. Sand; I.E.E.E. Communication and Electronics, July, 1963.

*Primary Examiner*—Thomas W. Brown

[57] ABSTRACT

A telephone subscriber system in which a concentrating portion of the central office telephone switching network is remotely located and connects to the remainder of the switching network at the central office via concentrated voice transmission paths and via multichannel data links which forward control and status signals between the two portions of the switching network.

REEXAMINATION CERTIFICATE ISSUED UNDER 35 U.S.C. 307.

THE PATENT IS HEREBY AMENDED AS INDICATED BELOW.

AS A RESULT OF REEXAMINATION, IT HAS BEEN DETERMINED THAT:

The patentability of claims 7 and 8 is confirmed.

Claims 1–6 are cancelled.

* * * * *